US 8,650,129 B2
Feb. 11, 2014

(12) United States Patent
Bailey, Jr.

(54) DYNAMICALLY REACTING POLICIES AND PROTECTIONS FOR SECURING MOBILE FINANCIAL TRANSACTION DATA IN TRANSIT

(75) Inventor: Samuel A. Bailey, Jr., Boca Raton, FL (US)

(73) Assignee: American Express Travel Related Services Company, Inc., New York, NY (US)

(*) Notice: Subject to any disclaimer, the term of this patent is extended or adjusted under 35 U.S.C. 154(b) by 671 days.

(21) Appl. No.: 12/690,461

(22) Filed: Jan. 20, 2010

(65) Prior Publication Data
US 2011/0178933 A1    Jul. 21, 2011

(51) Int. Cl.
G06Q 20/00 (2012.01)

(52) U.S. Cl.
USPC .......................................................... 705/64

(58) Field of Classification Search
USPC .......................................................... 705/64
See application file for complete search history.

(56) References Cited

U.S. PATENT DOCUMENTS

| | | | |
|---|---|---|---|
| 4,796,025 A | 1/1989 | Farley et al. | |
| 5,784,566 A | 7/1998 | Viavant et al. | 395/200.59 |
| 6,088,450 A | 7/2000 | Davis et al. | |
| 6,321,338 B1 | 11/2001 | Porras et al. | |
| 6,330,546 B1 | 12/2001 | Gopinathan et al. | |
| 6,484,182 B1* | 11/2002 | Dunphy et al. | 700/231 |
| 6,530,024 B1 | 3/2003 | Proctor | |
| 6,590,580 B2 | 7/2003 | Horikawa et al. | |
| 6,681,249 B2 | 1/2004 | Christensen et al. | |
| 6,744,780 B1 | 6/2004 | Gu et al. | |
| 6,961,858 B2* | 11/2005 | Fransdonk | 726/29 |
| 6,965,294 B1 | 11/2005 | Elliott et al. | |
| 7,020,635 B2* | 3/2006 | Hamilton et al. | 705/51 |
| 7,058,968 B2* | 6/2006 | Rowland et al. | 726/1 |
| 7,080,049 B2* | 7/2006 | Truitt et al. | 705/75 |
| 7,090,128 B2* | 8/2006 | Farley et al. | 235/384 |
| 7,107,462 B2* | 9/2006 | Fransdonk | 713/193 |
| 7,150,045 B2* | 12/2006 | Koelle et al. | 726/26 |
| 7,152,242 B2 | 12/2006 | Douglas | |
| 7,260,844 B1 | 8/2007 | Tidwell et al. | |
| 7,305,709 B1* | 12/2007 | Lymer et al. | 726/25 |

(Continued)

FOREIGN PATENT DOCUMENTS

JP    2004078539 A    3/2004

OTHER PUBLICATIONS

Selim Aissi et al., "Security for Mobile Networks and Platforms", Artech House Publishers (2006), 329 pages.

(Continued)

Primary Examiner — Jacob C. Coppola
(74) Attorney, Agent, or Firm — Fitzpatrick, Cella, Harper & Scinto

(57) ABSTRACT

A secure mobile financial transaction is provided by receiving, over a communication network, a list of protection mechanisms available for implementation by an external terminal. Security-related data is received from one or more sensors and an attack signature is computed based on the security-related data. An appropriate security policy is selected from multiple security policies stored in a database based on the list of protection mechanisms and the attack signature. A secure communication session is established between the external terminal and an internal network component according to the selected security policy. A data message associated with a mobile financial transaction is communicated over the communication network during the communication session.

18 Claims, 6 Drawing Sheets

(56) References Cited

U.S. PATENT DOCUMENTS

| | | | |
|---|---|---|---|
| 7,565,693 B2 * | 7/2009 | Shin et al. ................ 726/23 |
| 7,587,502 B2 * | 9/2009 | Crawford et al. ............ 709/229 |
| 7,660,795 B2 | 2/2010 | Barrett et al. |
| 7,711,586 B2 * | 5/2010 | Aggarwal et al. ................. 705/5 |
| 7,895,649 B1 * | 2/2011 | Brook et al. .................... 726/22 |
| 7,937,353 B2 * | 5/2011 | Bernoth et al. ................ 706/46 |
| 8,001,054 B1 | 8/2011 | Peart et al. |
| 8,074,282 B1 * | 12/2011 | Lymer et al. .................... 726/25 |
| 8,087,085 B2 | 12/2011 | Hu et al. |
| 8,146,160 B2 * | 3/2012 | Orr et al. ........................ 726/23 |
| 2003/0110392 A1 | 6/2003 | Aucsmith et al. |
| 2003/0145226 A1 * | 7/2003 | Bruton et al. ................. 713/201 |
| 2004/0015719 A1 * | 1/2004 | Lee et al. ...................... 713/201 |
| 2004/0030927 A1 * | 2/2004 | Zuk ............................... 713/201 |
| 2004/0049698 A1 * | 3/2004 | Ott et al. ....................... 713/201 |
| 2004/0187034 A1 | 9/2004 | Tamura et al. |
| 2005/0091527 A1 | 4/2005 | Swander et al. ............. 713/201 |
| 2005/0125360 A1 | 6/2005 | Tidwell et al. |
| 2005/0182969 A1 | 8/2005 | Ginter et al. |
| 2005/0201561 A1 * | 9/2005 | Komano et al. ............... 380/255 |
| 2006/0085839 A1 | 4/2006 | Brandt et al. ...................... 726/2 |
| 2006/0090198 A1 | 4/2006 | Aaron ............................... 726/6 |
| 2006/0161435 A1 | 7/2006 | Atef et al. |
| 2006/0200427 A1 | 9/2006 | Morrison et al. ............... 705/67 |
| 2006/0200666 A1 | 9/2006 | Bailey, Jr. ...................... 713/168 |
| 2006/0225132 A1 | 10/2006 | Swift et al. ....................... 726/11 |
| 2006/0276173 A1 | 12/2006 | Srey et al. |
| 2006/0291447 A1 | 12/2006 | Siliquini et al. |
| 2007/0016955 A1 | 1/2007 | Goldberg et al. ................ 726/25 |
| 2007/0036314 A1 * | 2/2007 | Kloberdans et al. .......... 379/189 |
| 2007/0143832 A1 | 6/2007 | Perrella et al. ..................... 726/5 |
| 2007/0234412 A1 * | 10/2007 | Smith et al. ........................ 726/11 |
| 2007/0250709 A1 | 10/2007 | Bailey, Jr. ...................... 713/168 |
| 2008/0086759 A1 | 4/2008 | Colson |
| 2008/0098464 A1 | 4/2008 | Mizrah |
| 2008/0120707 A1 | 5/2008 | Ramia |
| 2008/0262990 A1 | 10/2008 | Kapoor et al. |
| 2008/0270579 A1 | 10/2008 | Herz et al. ..................... 709/219 |
| 2008/0307487 A1 * | 12/2008 | Choyi et al. ......................... 726/1 |
| 2009/0125977 A1 | 5/2009 | Chander et al. |
| 2009/0158425 A1 | 6/2009 | Chan et al. ....................... 726/21 |
| 2009/0165125 A1 | 6/2009 | Brown et al. |
| 2009/0216910 A1 | 8/2009 | Duchesneau |
| 2009/0222907 A1 | 9/2009 | Guichard |
| 2009/0271844 A1 | 10/2009 | Zhang et al. ...................... 726/2 |
| 2009/0300716 A1 | 12/2009 | Ahn ................................... 726/1 |
| 2009/0328219 A1 * | 12/2009 | Narayanaswamy ............ 726/23 |
| 2010/0010874 A1 | 1/2010 | Howard et al. |
| 2010/0082513 A1 | 4/2010 | Liu |
| 2010/0251388 A1 | 9/2010 | Dorfman |
| 2010/0275010 A1 | 10/2010 | Ghirardi |
| 2010/0294927 A1 | 11/2010 | Nelson et al. |

OTHER PUBLICATIONS

Zhigun Chen, "Java Card Technology for Smart Cards: Architecture and Programmers Guide", Prentice Hall (2000), pp. 57-63.

Clayton M. Christensen and Michael E. Raynor, "The Innovators Solution: Creating and Sustaining Successful Growth" Harvard Business Press (2003), pp. 31-71.

Edward T. Dowling, "Mathematical Methods for Business and Economics", McGraw-Hill (2009), pp. 89-127 and 177-196.

Robert Gibbons, "Game Theory for Applied Economists", Princeton University Press (1992), pp. 29-48 and 173-255.

Charles W. L. Hill and Gareth R. Jones, "Strategic Management Theory: An Integrated Approach", South-Western College Pub, 9th edition (2009), pp. 208-241.

Michael Howard and David Leblanc, "Writing Secure Code, Practical Strategies and Techniques for Secure Application Coding in a Networked World", Microsoft Press, 2nd ed. (2003), pp. 69-124, 259-298, and 455-476.

Ronald L. Krutz and Russell Dean Vines, "The CISSP Prep Guide, Mastering the Ten Domains of Computer Security", Wiley (2001), pp. 183-213.

Peter Morris, "Introduction to Game Theory", Springer Verlag New York, Inc. (1994), pp. 65-97.

Winn Schwartau, "Time Based Security", Interpact Press (1999), pp. 33-36, 65-74, and 121-125.

Shreeraj Shah, "Hacking Web Services", Charles River Media (2006), pp. 171-221, 271-298.

Fred B. Wrixon, "Codes Ciphers & Other Cryptic and Clandestine Communications, Making and Breaking Secret Messages from Hieroglyphs to the Internet", Black DogLrvrnthal Pub. (1998), pp. 298-309.

Colin English et al., "Dynamic Trust Models for Ubiquitous Computing Environments", University of Strathclyde, Glasgow, Scotland, Department of Computer and Information Sciences (2002).

Graham Messick, "Cyber War: Sabotaging the System" (Nov. 8, 2009), CBS Interactive Inc., http://www.cbsnews.com/stories/2009/11/06/60minutes/main5555565.shtml?tag=currentVideoInfo;segmentUtilities.

Peng Ning and Sushil Jajodia, "Intrusion Detection Techniques", http://discovery.csc.ncsu.edu/Courses/csc774-S03/IDTechniques.pdf (last visited Sep. 24, 2010).

Brian Wotring, "Host Integrity Monitoring: Best Practices for Deployment" (Mar. 31, 2004), http://www.symantec.com/connect/articles/host-integrity-monitoring-best-practices-deployment.

* cited by examiner

DYNAMICALLY REACTING POLICIES AND PROTECTIONS FOR SECURING MOBILE FINANCIAL TRANSACTION DATA IN TRANSIT

BACKGROUND OF THE INVENTION

1. Field of the Invention

The present invention generally relates to information security systems, and more particularly, to dynamically reacting policies and protections for securing mobile financial transaction data in transit.

2. Related Art

With the proliferation of mobile communication devices, such as mobile telephones, financial account holders that have such devices have begun to use them to complete financial transactions. Enabling financial account holders to do so, however, poses unique security risks for financial account issuers, particularly because security capabilities and risks vary widely across different mobile communication devices and different mobile communication networks. For example, typical payment systems involve point-of-sale (POS) terminals that are usually owned and designed by either financial transaction issuers or merchants. In contrast, because mobile communication devices are manufactured by various manufacturers and can be modified by third parties, financial account issuers have less control and knowledge of the security capabilities and risks associated with them. This makes it more difficult to control the security of financial transactions that are completed using mobile communication devices. Security measures vary based on particular models of mobile communication devices, thus compounding this inherent security risk.

The risk for financial account issuers is further complicated by the mobility of mobile communication devices. Each location in which mobile communication devices can be operated potentially has a different security environment. As a result, different security measures for each location are necessary. For example, bringing a mobile communication device into a foreign country may require the mobile communication device to roam on a foreign or visiting mobile communication network, which has inherently different security countermeasures, attack scenarios, risks, capabilities, and other characteristics.

Security designers perform a labor-intensive and exhaustive analysis of the risks associated with each component of a new network in an attempt to safely interface their existing security system with the new network. The existing security system is often modified to accommodate the risks associated with the new network. This process takes a substantial amount of time and thus limits the speed with which financial account issuers can enter new markets that utilize mobile-based financial transaction networks. As a consequence, they can lose market share.

In addition, security designers typically assume that all security characteristics and risks of the network components will remain static, or remain within a tolerance related to nominal protection, once the system is deployed. A typical security system thus utilizes a particular set of security measures deployed until the security system is taken offline and either replaced or modified. In other words, if risks of the security system change, for example, due to an innovation, a new service, discovery of a design or product flaw, breach of a security measure by an attacker, etc., a maintenance window or an outage must be realized to enable the security system to be modified to respond to a security breach, patch, or upgrade. Such a system cannot adapt dynamically to various detected feedback relating to changes impacting the security situation of the network. Typical security systems, therefore, lack the adaptability necessary to be suitable for mobile-based financial transaction systems that must constantly innovate to adapt to changing markets, services, and business models. Moreover, the static security measures of typical fortress security systems increase the ease with which internal and external attackers can circumvent less adaptive security measures. As payment and network systems adapt to next generation payment and communication, the attacks and exploits will also evolve into next generation criminal exploits. As higher communication speeds, multiple communication channels, and multiple communication protocols become more common for convergent services, attack scenarios and protection mechanisms will be represented by matrices as opposed to the linear singularity used in traditional systems to represent exposure.

Notwithstanding the above-mentioned security risks, enabling mobile transactions is still a particularly attractive means for financial account issuers to enter the markets of non-bankable countries where widespread POS infrastructure is neither available nor practical.

Given the foregoing, it would be useful to be able to continuously detect changes in network security characteristics, and adapt based on these detected changes to maintain an acceptable level of security for existing and new network connections including merchants, customers, and partners for visiting and home networks.

It also would be useful to enable business entities, such as financial account issuers, to enter new markets (e.g., the mobile-based financial transaction market) with minimal modifications to their existing security system, and to accept new risk scenarios with the ability to manage magnitude of exposure by network segment, region, issuer, partner, device, and/or account across numerous device and network types.

In addition, it would be useful to enable the characterization of currently uncharacterized (e.g., non-domestic) communication network components and/or attributes to enable adaptation to the risks to maintain an acceptable level of security.

BRIEF DESCRIPTION OF THE INVENTION

The present invention meets the above-identified needs by providing systems, methods, and computer program products for securing mobile financial transaction data in transit over a communication network.

Trust mediator agents, which are associated with each network component, continuously detect changes or signatures in the security characteristics of each network component using sensors and feed the detected changes or signatures back to a trust mediator. The trust mediator uses the feedback from the trust mediator agents to determine whether and how to modify currently running security safeguards in order to maintain an appropriate level of security that considers the interdependency of each component and asset at risk. Modifications, if any, are communicated by the trust mediator to the appropriate network component via its associated trust mediator agent for implementation. The process is recursive and thus continuously adapts to changes in network security characteristics as they arise over time to strike a balance between the probability of loss and magnitude of loss versus acceptable risk to enable business transactions to continue without disruption at an account level and/or at a network component level.

A business entity (e.g., a financial account issuer) can integrate new communication networks having new security characteristics into their existing network without the need to perform an exhaustive and labor-intensive upfront analysis to estimate the security impact a new communication network will have on their existing network. Instead, the business entity can define rules, such as a threshold of acceptable risk, begin to communicate with the new network, and enable their existing security system to detect and adapt to the security characteristics of the new network while maintaining the acceptable risk acceptance level. Managing system interdependency relating to security signature state assists in evaluating changes related to new exploits, products, services, or innovations to reduce time-to-market while managing the acceptable level of risk exposed to the business within nominal levels to maintain brand and financial equity.

Users' expectations regarding security measures are taken into account. Thus, if a particular security measure is too inconvenient for a user, the security measure is modified or reduced to a minimal level within limits that do not degrade nominal protection for the system. This balances the risk acceptance of a firm with a convenience cost representing user or account holder countermeasure choice, and provides the issuer and the account holder with firm acceptable transaction risk elasticity. Alternatively, if the security measure provides too low a security level for the user to accept the security measure, it is modified or replaced with a more rigorous security measure with an alternate method. The effect is to increase the propensity for user satisfaction and thus movement towards equilibrium of strategy and payoff for usage of the system based on time, location, and relevance, and results in more efficient risk models to increase market share for the business entity. Users are offered choices to increase their propensity of adoption and use of security methods, while mitigating the circumnavigation of security controls that puts merchants, financers, and financees at risk.

In one embodiment, a processor coupled to a memory receives, over a communication network, a list of protection measures available for implementation by an external terminal. The processor receives security-related data from one or more sensors and computes an attack signature based on the security-related data. The processor selects an appropriate security policy from multiple security policies stored in a database based on the list of protection measures and the attack signature. A secure communication session is established between the external terminal and an internal network component according to the selected security policy. A data message associated with a mobile financial transaction is communicated over the communication network during the communication session.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the following drawings.

DETAILED DESCRIPTION

I. Overview

Figure 1:
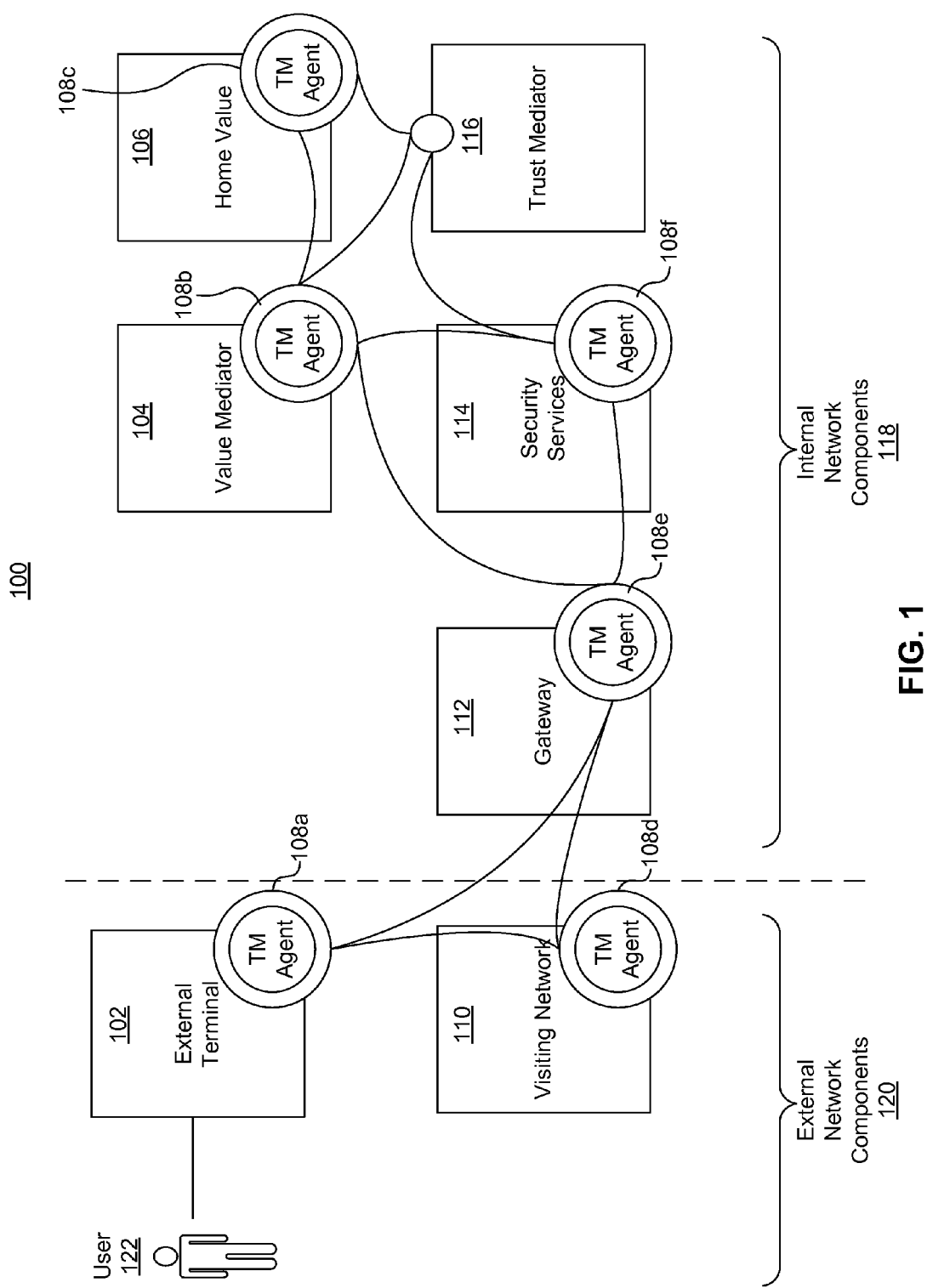
FIG. 1 is a diagram of an exemplary security system for adaptively securing mobile communication device transactions in accordance with an embodiment of the present invention.

The present invention is directed to dynamically reacting policies and protections for securing mobile financial transaction data in transit, which are now described in more detail herein in terms of an example mobile payment system. This is for convenience only and is not intended to limit the application of the present invention. In fact, after reading the following description, it will be apparent to one skilled in the relevant art(s) how to implement the following invention in alternative embodiments (e.g., general network security systems, mass transit security systems, homeland security systems, home and business security systems, etc.).

The terms "user," "consumer," "account holder," and/or the plural form of these terms are used interchangeably throughout herein to refer to those persons or entities capable of accessing, using, being affected by and/or benefiting from the present invention.

A "merchant" as used herein refers to any person, entity, distributor system, software and/or hardware that is a provider, broker and/or any other entity in the distribution chain of goods or services. For example, a merchant can be a grocery store, a retail store, a travel agency, a service provider, an online merchant or the like.

A "transaction account" as used herein refers to an account associated with an open account or a closed account system. The transaction account can exist in a physical or non-physical embodiment. For example, a transaction account can be distributed in non-physical embodiments such as an account number, frequent-flyer account, telephone calling account or the like. Furthermore, a physical embodiment of a transaction account can be distributed as a financial instrument.

An "account," "account number," or "account code," as used herein, can include any device, code, number, letter, symbol, digital certificate, smart chip, digital signal, analog signal, biometric or other identifier/indicia suitably configured to allow a consumer to access, interact with or communicate with a financial transaction system. The account number can optionally be located on or associated with any financial transaction instrument (e.g., a rewards, charge, credit, debit, prepaid, telephone, embossed, smart, magnetic stripe, bar code, transponder or radio frequency card).

The terms "financial account issuer," "account issuer," and "issuer," and/or the plural forms of these terms are used interchangeably throughout herein to refer to those persons or entities that provide transaction account(s) to account holders. For example, an issuer may be a credit card issuer, a bank, or any other financial institution.

In general, transaction accounts can be used for transactions between the user and merchant through any suitable online or offline communication network, such as, for example, a wired network, a wireless network, a telephone network, an intranet, the global, public Internet, and/or the like. Additionally, the user can complete transactions with the merchant using any suitable communication device, such as a point-of-interaction device (e.g., a point-of-sale (POS) device, a personal digital assistant (PDA), a mobile telephone, a kiosk, resource access, area access, entitlement access, etc.), a radio frequency enabled transaction card, and/or the like.

A financial transaction instrument (also referred to as a "payment device") can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument can also have electronic functionality provided by a network of electronic circuitry that is printed or otherwise incorporated onto or within the transaction instrument (and typically referred to as a "smart card"), or be a fob having a transponder and an RFID reader.

The term "safeguard," "security measure," "security safeguard," "protection method," "protection mechanism," and/or the plural forms of these terms are used interchangeably throughout herein to refer to any process, hardware, software, algorithm, countermeasure, or the like, that increases security, confidentiality, and/or integrity of data communicated over communication networks. For example, a safeguard can be a key length, an encryption/decryption algorithm, a checksum, a hash function, an access level, a password requirement, a fingerprint requirement, or the like. Protection mechanism(s) may be one-dimensional, i.e., composed of a single protection mechanisms, or multi-dimensional, composed of multiple protection mechanisms.

The term "security-related information" is used herein to refer to any data or information that can be used by a trust mediator (described below) as the basis for making decisions as to implementations of security policy. For example, security-related information can include data relating to threats, exploits, attacks, safeguards, security measures, security safeguards, protection mechanisms, financial transaction-related data, non-financial-transaction-related data, mobile phone usage data, magnitude data, loss expectancy data, and the like.

II. System

FIG. 1 is a diagram of an exemplary security system 100 for adaptively securing mobile communication device transactions in accordance with an embodiment of the present invention. As shown in FIG. 1, security system 100 includes both internal network components 118 and external network components 120. Internal network components 118 are network components that are internal to an issuer network. External network components 120 are network components that are external to the issuer network.

External network components 120 include an external terminal 102, which is any electronic communication device a consumer can use as an interface to complete a financial transaction with a merchant. Examples of types of financial transactions a user 122 may request include a purchase at a point-of-sale (POS) device, a transfer of funds from an account of user 122 to that of another user, a mobile-to-mobile fund transfer, a transfer of funds between two accounts commonly owned by user 122, a request for data stored in one of internal network components 118 in association with an account of user 122, a request to modify data stored in one of internal network components 118 in association with an account of user 122, etc. For example, external terminal 102 can be a point-of-sale (POS) device, a kiosk, or a mobile communication device such as a mobile telephone, a personal computer, a POS device, a personal digital assistant (PDA), a portable computing device, a radio frequency enabled transaction card, or the like.

Another external network component 120 is a visiting network 110, which is any electronic communication network that is communicatively coupled to external terminal 102 and one or more internal network components 118. Example visiting networks 110 include a mobile telephone carrier network, an external payment network and/or service, a media network, a private network, a public network, a Bluetooth™ network, an automated clearing house (ACH) network, a peer-to-peer (P2P) network, or the like.

Internal network components 118 include a gateway 112, which is communicatively coupled to visiting network 110. External terminal 102 communicates with internal network components 118 through visiting network 110. Gateway 112 translates communication network protocols to enable proper communication between visiting network 110 and internal network components 118. Gateway 112 also includes any number of communication network modules depending on the characteristics of visiting network 110 and internal network components 118. For instance, gateway 112 can include a firewall, a network address resolution table, a proxy for address translation, a session border controller, etc. (all not shown).

Another internal network component 118 is a security services module 114. Security services module 114 is communicatively coupled to gateway 112, and performs security functions such as encryption, decryption, key management, and/or any other functions suitable for ensuring the security, confidentiality, and/or integrity of data communicated throughout system 100.

Another internal network component 118 is home value (or valuation) module 106, which includes a memory or other electronic storage device (not shown) that electronically stores information related to electronic assets owned by the issuer. For example, home value 106 can store data entries representing credit, deposits, loyalty points, reward points, media, and the like. Each data entry of home value 106 has a value-base and an associated quantitative and/or qualitative value that also are stored in the memory (not shown) and are used by trust mediator 116 in order to assess security risks associated with that particular data entry.

Internal network components 118 also include a value mediator 104, which valuates electronic assets owned by an entity other than the issuer. These assets have a value-base other than the value-bases stored in home value 106. Value mediator 104 thus computes a quantitative value, and/or normalizes a qualitative value, for these assets to exchange the value across different value-bases. In addition, trust mediator 116 uses this quantitative value to compute risk magnitudes associated with these assets. For example, if the value of the transaction or commerce was an asset calculated by value mediator 104, then this computed value is input to trust mediator 116 to react by changing one or more protections, countermeasures, or policies related to the asset if thresholds associated with acceptable risk exposure are exceeded, or if user methods do not achieve an equilibrium between each player in the system, including stakeholders and criminals.

Trust mediator (TM) agents 108a-108f (collectively 108) are deployed on external terminal 102, visiting network 110, gateway 112, security services module 114, value mediator 104, and home value module 106, respectively. TM agents 108 detect and assess security-related information collected from one or more sensors corresponding to each respective network component and communicate this information to trust mediator 116. The sensors measure a physical quantity, such as an electronic signal or other data, and convert it into a signal which can be read by an observer and/or by an instrument, such as one or more of the TM agents 108 or trust mediator 116. The sensors can receive quantitative input, for example, from machines, electronics, etc. Alternatively, or in addition, the sensors can receive qualitative input from a human that initiates a topic of concern, such that data collection and normalization can be utilized for finite measurements, good will and intuitive measurements, and observations, which can then be validated with other qualitative or quantitative input. Trust mediator 116, in turn, communicates instructions to one or more of the TM agents 108 to modify implementation of security safeguards. Trust mediator 116 also assesses information received from the TM agents 108 and determines whether and/or how to modify security safeguards according to security and/or trust mediation algorithms that can be singular or a summation of plural safeguards and countermeasures interchangeable based on security goals.

An exemplary external terminal 102, as well as exemplary processes for adapting security measures of a communication network based on dynamic feedback, collecting data from sensors, and reporting the data to a trust mediator are disclosed in U.S. patent application Ser. No. 12/640,183, entitled "Systems, Methods, and Computer Program Products for Collecting and Reporting Sensor Data in a Communication Network," filed Dec. 17, 2009, which is hereby incorporated by reference in its entirety.

Figure 2:
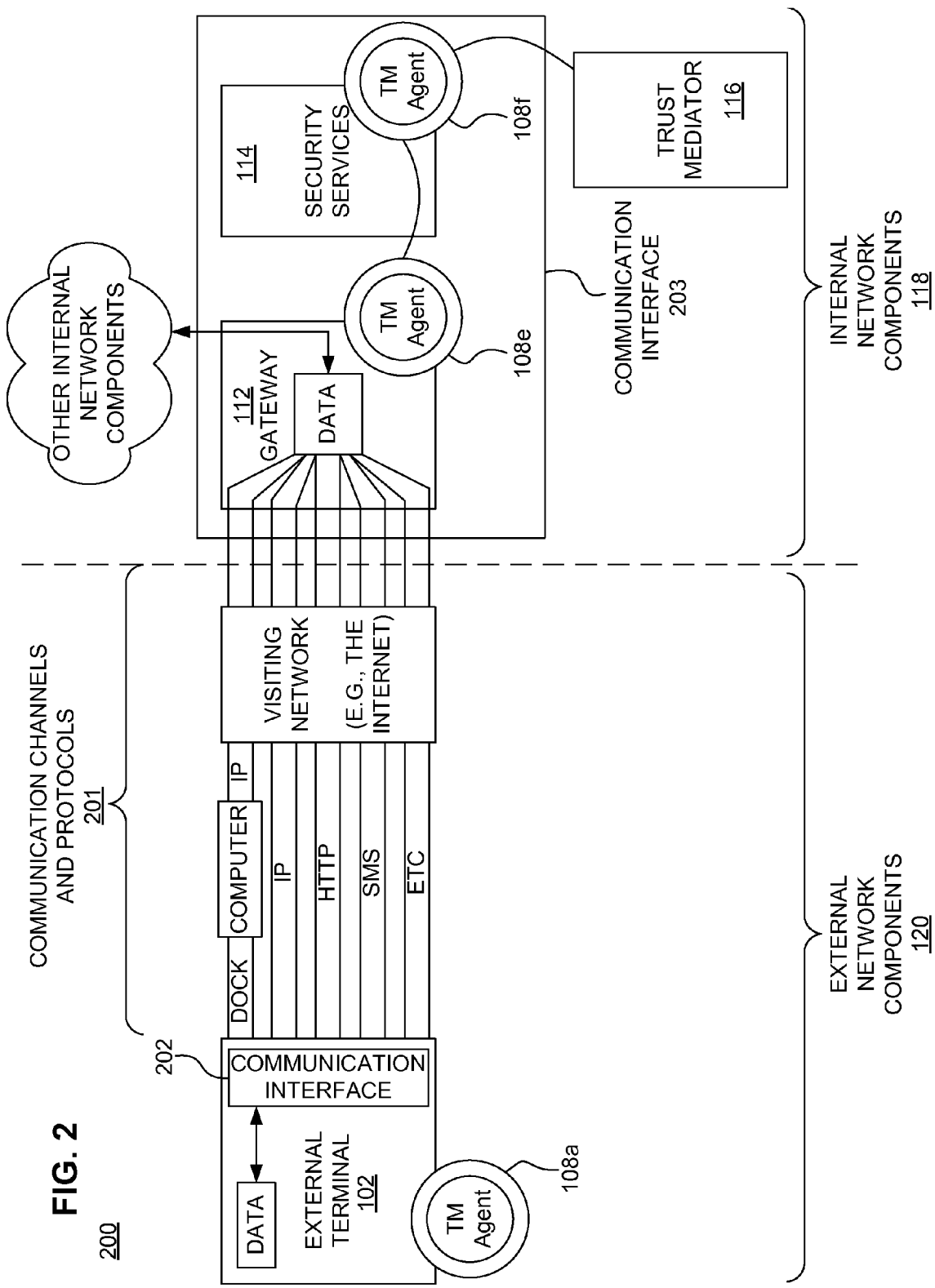
FIG. 2 is a diagram depicting exemplary communication channels and protocols by which an external terminal communicates with an internal network.

FIG. 2 is a diagram of a system 200 depicting exemplary communication channels and protocols by which an external terminal communicates with an internal network. As shown in FIG. 2, external terminal 102 communicates with internal network components 118 via one or more communication channels and protocols 201. As discussed in further detail below with respect to FIGS. 3 and 4, trust mediator 116 selects one or more appropriate protection mechanisms (e.g., encryption methods), communication channels, and protocols to use to secure mobile financial transaction data in transit. Trust mediator 116 then communicates the selected protection mechanism(s), communication channel(s), and communication protocol(s) to TM agents 108a-108f as necessary. TM agent 108a, in turn, communicates the selected protection mechanism(s), communication channel(s), and protocol(s) to a communication interface module 202 of external terminal 102. Communication interface modules 202 and 203 then implement the selected protection mechanism(s) for the data in transit. In turn, communication interface modules 202 and 203 transmit and receive the data in transit according to the selected protocol(s) via the selected communication channel(s) until a new protection mechanism, communication channel, and/or protocol is received from the corresponding TM agent 108a-108f. The implementation of protection mechanisms, communication channels, and protocols are discussed in further detail below with respect to FIGS. 4 and 5. Once the data in transit is securely received by gateway 112, it is distributed to other internal network components 118 as necessary to perform mobile financial transactions, etc.

III. Process

A. Overview

Figure 3:
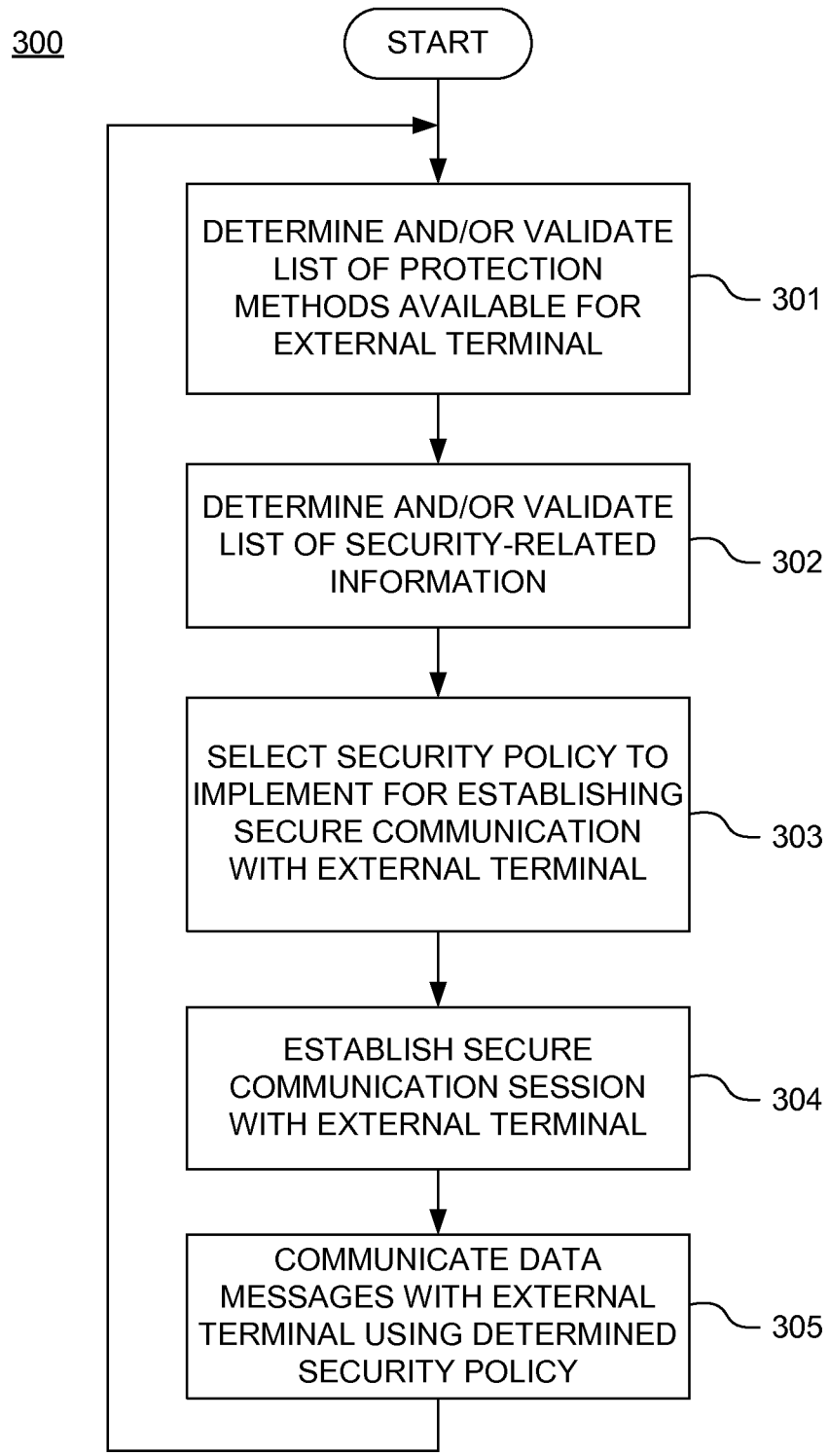
FIG. 3 is a flowchart illustrating an exemplary process for implementing dynamically reacting policies and protections to secure mobile financial transaction data in transit.

FIG. 3 is a flowchart illustrating an exemplary process 300 for implementing dynamically reacting policies and protections to secure mobile financial transaction data in transit. At block 301, trust mediator 116 determines and/or validates a list of protection mechanisms that are available for implementation by external terminal 102. Exemplary systems and methods for determining which protection mechanisms are available for implementation by an external terminal are disclosed in U.S. patent application Ser. No. 12/640,289, entitled "Dynamically Reacting Policies and Protections for Securing Mobile Financial Transactions," filed Dec. 17, 2009, which is hereby incorporated by reference in its entirety. If the list of protection mechanisms available for implementation by external terminal 102 has already been created in the form of a protection matrix, then trust mediator 116 validates the protection matrix using time stamps to ensure that it is up to date. If the protection matrix has not yet been created, then trust mediator 116 creates one.

At block 302, trust mediator 116 determines and/or validates a list of security-related information, including current attacks, threats, exploits, etc., detected by sensors (not shown) distributed throughout system 100. Exemplary systems and methods for detecting security-related information using sensors are disclosed in U.S. patent application Ser. No. 12/640,183, entitled "Systems, Methods, and Computer Program Products for Collecting and Reporting Sensor Data in a Communication Network," filed Dec. 17, 2009.

Trust mediator 116 compiles the security-related information (e.g., threats, exploits, attacks, etc.) determined and/or validated at block 302 and generates one or more attack signatures by computing summation(s) of portions of the security-related information. In particular, trust mediator 116 combines one or more portions of the detected security-related information into a multi-dimensional combination, with each combination representing a specific attack signature. For instance, one attack signature may be defined as any combination of security-related data that includes a brute-force attack on a particular encryption algorithm and a denial-of-service (DoS) attack. Another attack signature can be defined as any combination that includes a spoofing attack (whereby one person or program successfully masquerades as another) and an associated retrieval of particular honeypot data.

At block 303, trust mediator 116 selects a security policy to implement to establish secure communication with external terminal 102. In general, selecting the security policy includes selecting one or more protection mechanism(s) (e.g., encryption methods), one or more communication channel(s), and one or more communication protocol(s) to be used throughout a communication session based on the protection matrix and the attack signature determined at blocks 301 and 302, respectively. In this way, in the event that one or more protection mechanism(s), communication channel(s), or communication protocol(s) have been exploited, trust mediator 116 changes the protection mechanism to another protection mechanism to maintain an acceptable level of security. In addition, or as an alternative, to changing the protection mechanism, trust mediator 116 can change the communication channel and/or communication protocol. An exemplary process for determining the appropriate security policy to implement to establish secure communication with external terminal 102 is discussed in further detail below with respect to FIG. 4.

At block 304, trust mediator 116 establishes a secure communication session with external terminal 102 by using the security policy selected at block 303. In general, establishing the secure communication session with external terminal 102 includes transmitting policy messages including details of the security policy to be implemented, to TM agents 108a-108f as necessary. An exemplary process for establishing the secure communication session with external terminal 102 is discussed in further detail below with respect to FIG. 5.

At block 305, external terminal 102 communicates with internal network components 118 by implementing the security policy established at block 303 throughout the secure communication session established at block 304. If implementing the security policy requires data and/or software to be executed by external terminal 102, then trust mediator 116 transmits the data and/or software to external terminal 102 over the communication network. Alternatively, or in addition, external terminal 102 can be preloaded with the data and/or software required for implementation of the security policy. The communication session continues, with the external terminal 102 and internal network components 118 implementing the security policy established at block 303 until a different security policy is designated by trust mediator 116.

B. Selecting a Security Policy

1. Determining Sufficiency of the Current Protection Mechanisms

Figure 4:
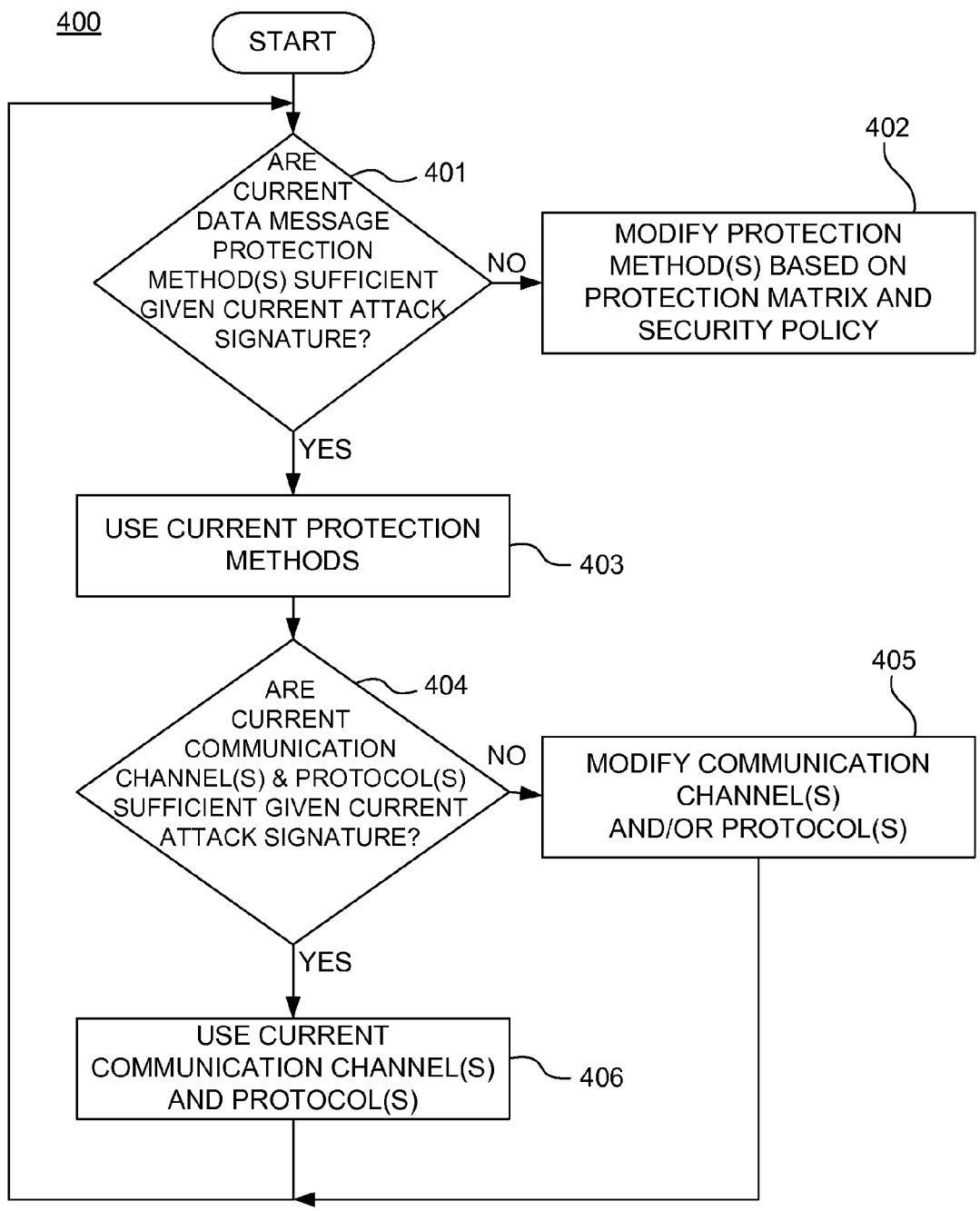
FIG. 4 is a flowchart illustrating an exemplary process for determining an appropriate policy for securing a communication session between an external terminal and an internal network.

FIG. 4 is a flowchart illustrating an exemplary process 400 for determining an appropriate policy for securing a communication session between an external terminal and an internal network. At block 401, trust mediator 116 determines whether the current data message protection mechanisms are appropriate given the current attack signature determined at block 302. In particular, trust mediator 116 computes a value associated with the data messages that are to be communicated between external terminal 102 and internal network components 118. The value is computed by using one or more valuation formulas, and in some cases the value may be equal to an amount of a financial transaction with which the data messages are associated. An example valuation formula includes converting a value in a first currency (e.g., U.S. dollars) into a corresponding value in a second currency (e.g., francs). Alternatively, or in addition, the value may be computed based on an account balance of a financial account with which the data messages are associated. Trust mediator 116 then computes a probability that the security of the data messages will be compromised based on the current data message protection mechanism(s) and the attack signature determined at block 302. Trust mediator 116 then computes a product of the computed value of the data messages and the computed probability that the data messages will be compromised to determine a total risk level associated with the data messages, the current data message protection mechanisms, and the attack signature.

2. Modifying the Current Protection Mechanism(s)

The total risk level is then compared to a predetermined threshold of acceptable risk. If the total risk level is less than or equal to the acceptable risk threshold then trust mediator 116 uses the current data message protection mechanism(s) at block 403 for communicating the data messages. If the total risk level is greater than the acceptable risk threshold then trust mediator 116 modifies the data message protection mechanism(s) at block 402 based on the protection matrix validated at block 301 and the predetermined acceptable risk threshold. In this case, trust mediator 116 uses the modified data message protection mechanism(s) for communicating the data messages.

There are multiple techniques by which trust mediator 116 can modify the data message protection mechanism(s) described above in connection with block 402. According to one example technique, trust mediator 116 modifies the data message protection mechanism by using an alternate encryption algorithm and/or a different type of encryption algorithm (e.g., switching between asymmetric and symmetric encryption algorithms) to encrypt the data messages. For example, trust mediator 116 can utilize numerous options relating to key ceremony, such as options relating to key generation value, key length, key type, seed, key ceremony definition, activation, time-to-live before deactivation or recertification, etc. Trust mediator 116 can also utilize options relating to one or more challenge/response techniques, pairing techniques, and/or key exchange techniques across one or more simultaneous and/or alternating communication channels.

In another embodiment, trust mediator 116 alternates between channel encryption and payload encryption. For example, the payload of a transmission can be encrypted while the channel used for transmission or routing data remains unencrypted. Or, channel encryption can be implemented such that not only the payload data is encrypted, but also the routing data for each data message is encrypted, establishing a confidential channel using one or more keys, key exchanges, and/or values integrated with a key ceremony driven by trust mediator 116 and/or security services module 114. A protection signature is implemented to maintain protection of system 100 by using dynamic reaction in response to dynamic detection.

In addition, trust mediator 116 can modify the data message protection mechanism by dividing the data messages into groups, and encrypting one group of messages using one encryption algorithm, and encrypting the other group of messages using another encryption algorithm. The data messages can be divided into groups based on value, such that the more valuable data messages are encrypted using a stronger encryption algorithm, and the less valuable data messages are encrypted using a weaker encryption algorithm. Or, the data messages can be divided into groups according to a predetermined pattern, or randomly, or using a combination of a predetermined pattern and randomness (hybrid), for all or part of the communication payload in transit and at rest. For example, a pattern of odd and even numbered messages can be encrypted such that odd numbered messages are encrypted with a first encryption algorithm and even numbered messages are encrypted with a second encryption algorithm. Alternatively, the data messages can be split into groups of a size determined by a pseudorandom number generator.

In another embodiment, trust mediator 116 modifies the data message protection mechanisms by dynamically rotating the keys used for encrypting the data messages. The keys can be rotated for use in consecutive groups of the data messages based on a predetermined time interval, a predetermined event, and/or a rate determined by a pseudorandom number and a seed. Alternatively, the data messages can be split into groups, using a different key for each group of messages.

Still another technique for modifying the data message protection mechanisms includes using different key exchange methods for exchanging encryption keys between external terminal 102 and internal network components 118.

According to yet another embodiment, trust mediator 116 modifies the data message protection mechanisms by changing the method of key generation. For example, trust mediator 116 can generate encryption keys using a pseudorandom number generator. Alternatively, encryption keys can be generated using a digital representation of a biometric identifier, such as a fingerprint, of user 122. Or, trust mediator 116 can generate encryption keys using a mathematical combination of a pseudorandom number and a digital representation of a biometric identifier of user 122.

Trust mediator 116 can also alternate the length of the encryption keys used for different data messages. For example, a longer key length can be used for data messages of high value than for data messages of low value. Or, key length can be periodically or randomly changed throughout a communication session by one or more of TM agents 108a-108f during a bidirectional communication session with security services module 114, which communicates on behalf of trust mediator 116. The state and method of trust and key ceremony are established to assure confidentiality, integrity, and trust between a mobile user, a mobile terminal, and the core assets and systems protecting value on the network.

In another embodiment, each network component, via their associated TM agent 108a-108f, can switch the data message protection mechanism(s) without being requested to do so by trust mediator 116, so long as the other network component and trust mediator 116 agree that the new data message protection mechanism(s) are acceptable. This may be useful, for instance, where a particularly risk averse user 122 of external terminal 102 desires a level of risk that is lower than that typically required by trust mediator 116.

By changing the data message protection mechanism(s) by using one or more of the technique(s) discussed above, a moving target is created, which helps to thwart attackers. As those skilled in the art will recognize, other techniques for modifying the data message protection mechanisms supporting dynamic change in protection methods based on perceived and/or real detection of change in attack signatures and/or risk exposure can be used and still be within the scope of the present invention.

3. Determining Sufficiency of the Current Communication Channel(s) and Protocol(s)

At block 404, trust mediator 116 determines whether the current data message communication channel(s) and/or protocol(s) are appropriate given the attack signature determined at block 302. In particular, as discussed above with respect to block 401, trust mediator 116 compares the computed total risk level to the predetermined acceptable risk threshold. If the total risk level is less than or equal to the acceptable risk threshold then trust mediator 116 uses the current data message communication channel(s) and/or protocol(s) at block 406 for communicating the data messages. If the total risk level is greater than the acceptable risk threshold then trust mediator 116 modifies the data message communication channel(s) and/or protocol(s) at block 405 based on the protection matrix validated at block 301 and the predetermined acceptable risk threshold. In this case, trust mediator 116 uses the modified data message communication channel(s) for communicating the data messages.

4. Modifying the Communication Channel(s) and Protocol(s)

There are multiple methods by which trust mediator 116 can modify the data message communication channel(s) and/or protocol(s), at block 405. As discussed above with respect to FIG. 2, external terminal 102 and internal network components can communicate using one or more communication channel(s) and/or communication protocol(s). FIG. 2 includes examples of communication channels and protocols 201. Other examples of communication protocols include PUSH NOTIFICATION SERVICE, WIFI, GSM, WIMAX, RFID, NFC, CDMA, BLUETOOTH, WAP, TCP/IP, and the like. According to one embodiment, in the event that one particular communication channel or protocol has become exploited, trust mediator 116 communicates over another communication channel or protocol.

Alternatively, trust mediator 116 can communicate by using different communication channels and/or protocols for different data messages or different portions of data messages. The data messages can be split up and transmitted by using different communication channels and/or protocols based on load and/or based on a predetermined number or size of data messages. Or, trust mediator 116 can split up data messages and transmit them by using different communication channels and/or protocols based on a generated pseudorandom number, a pseudorandom order, and/or a pseudorandom method of reassembly, and a seed.

In the event that data messages are split up and routed across different communication channels, a policy message discussed below with respect to FIG. 5 defines how the data messages are split up, and how to reassemble the messages. For example, trust mediator 116 can split up the data messages, sending pieces of it via different real-time or non-real-time communication channels and/or protocols, such as via e-mail, social websites, etc., for retrieval and reassembly by the targeted recipients across alternate channels. The policy message also defines how many, and/or what sizes of, subsequent messages will be transmitted, and on which data message communication channel(s).

By changing the data message communication channel(s) and/or protocol(s) by using one or more of the technique(s) discussed above, a moving target is created, which helps to thwart attackers by increasing the domain an attacker would have to analyze, exploit, and use to gain access to data, messages, and/or communication sessions. As those skilled in the art will recognize, other techniques for modifying the data message communication channels and protocols can be used and still be within the scope of the present invention.

In one embodiment, each network component, via their associated TM agent 108a-108f, can switch the data message communication channel(s) and/or data message communication protocol(s) without being requested to do so by trust mediator 116, so long as the other network component and trust mediator 116 agree that the new data message communication channel(s) and/or data message communication protocol(s) are acceptable. This may be useful, for instance, where a particularly risk averse user 122 of external terminal 102 desires a level of risk that is lower than that typically required by trust mediator 116.

In another embodiment, if the data message protection mechanisms determined to be available for external terminal 102 at block 301 are insufficient to decrease the total risk to a level within the acceptable risk threshold, then trust mediator 116 modifies the data message communication channel(s) and/or data message communication protocol(s) at block 405 to decrease the total risk to be within the acceptable risk threshold. Similarly, if the available data message communication channel(s) and/or data message communication protocol(s) are insufficient to decrease the total risk to a level within the acceptable risk threshold, then trust mediator 116 modifies the data message protection mechanism(s) at block 402 to decrease the total risk to be within the acceptable risk threshold.

Alternatively, trust mediator 116 can compute the different risk levels that would result from multiple possible combinations of specific modifications to the data message protection mechanism(s), the data message communication channel(s), and the data message communication protocol(s). Trust mediator 116 then selects the combination of the specific modifications to the data message protection mechanism(s), the data message communication channel(s), and the data message communication protocol(s) that results in a risk level closest to the acceptable risk threshold.

Process 400 is then repeated so as to ensure that the data message protection mechanism(s) and data message communication channel(s) and data message communication protocol(s) being implemented are sufficient for the latest detected attack signatures and protection matrix. In particular, trust mediator 116 uses time stamps to determine whether the currently implemented data message protection mechanism(s), data message communication channel(s), and/or data message communication protocol(s) are to be changed. If a more up-to-date attack signature and/or protection matrix is available, then trust mediator repeats process 400 to implement appropriate data message protection mechanism(s), data message communication channel(s), and data message communication protocol(s) to maintain the predetermined acceptable risk level.

C. Establishing a Secure Communication Session

Figure 5:
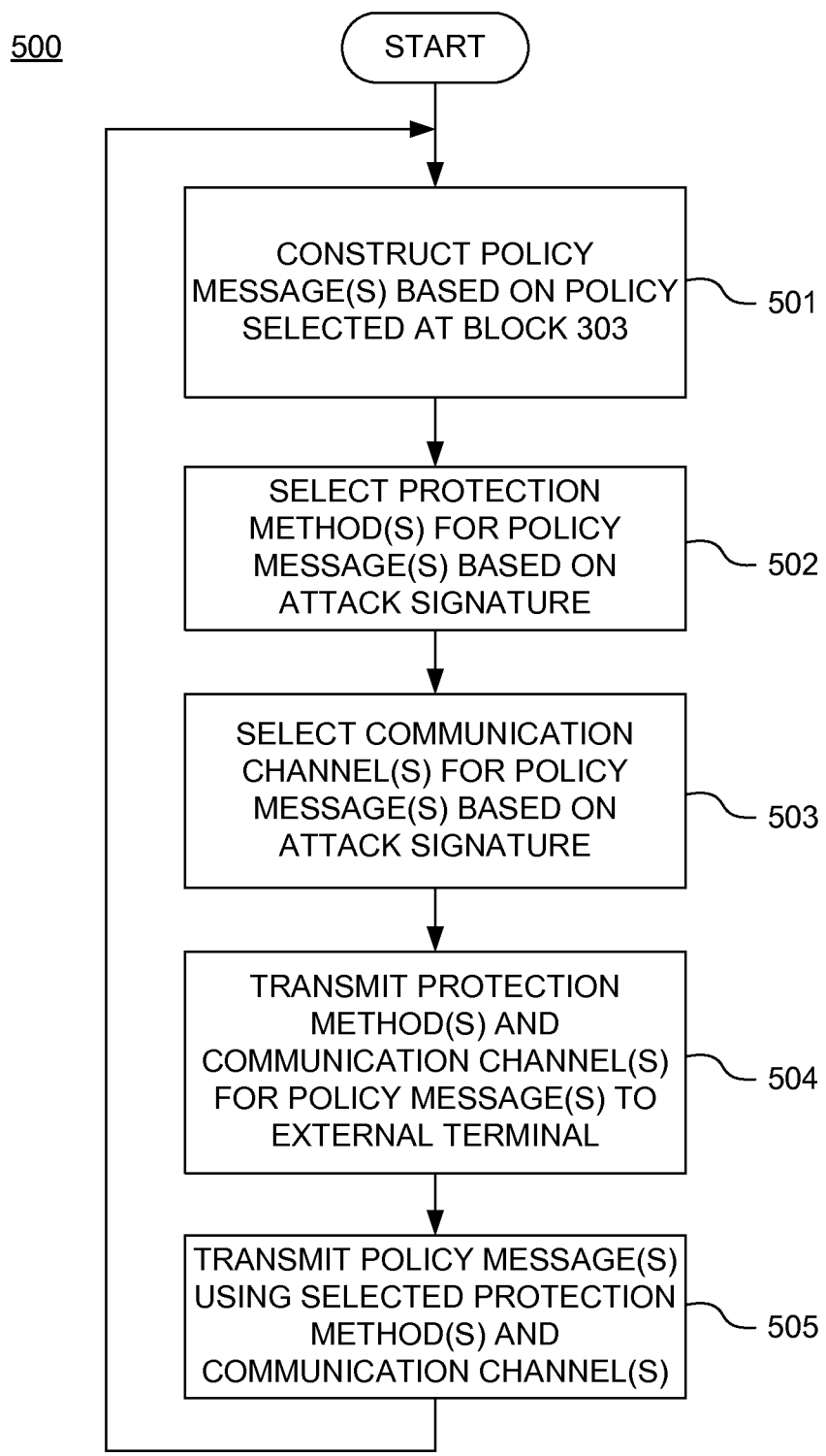
FIG. 5 is a flowchart illustrating an exemplary process for establishing a secure communication session between an external terminal and an internal network.

FIG. 5 is a flowchart illustrating an exemplary process for establishing a secure communication session between an external terminal and an internal network. At block 501, trust mediator 116 constructs, based on the security policy determined at block 303, a policy message associated with the specific data messages to be communicated between external terminal 102 and internal network components 118. The policy message defines the implementation details of the security policy determined at block 303. In particular, the policy message includes the details of the specific data message protection mechanism(s), data message communication channel(s), and data message communication protocol(s) to be used for the communication session. The policy message can be included in one or more header field(s) of the data messages to be communicated, or can be constructed as one or more standalone message(s) communicated between trust mediator 116, security services module 114, TM agents 108a-108f, and/or other security agents or delegated applications or recipients. This allows coordination of dynamic adjustment of protection using a system-wide view.

At block 502, trust mediator 116 determines the appropriate policy message protection mechanism(s) to use for communicating the policy message to the necessary TM agents 108a-108f, given the attack signature determined at block 302. To do this, trust mediator 116 uses a process similar to that discussed above for determining the appropriate data message protection mechanism(s) for communicating data messages. In particular, trust mediator 116 compares the total risk level computed at block 401 to the predetermined threshold of acceptable risk discussed above. If the total risk level is less than or equal to the acceptable risk threshold then trust mediator 116 uses the current policy message protection mechanism(s) for communicating the policy message. If the total risk level is greater than the acceptable risk threshold then trust mediator 116 modifies the policy message protection mechanism(s) based on the protection matrix determined at block 301 and the predetermined acceptable risk threshold, and uses the modified policy message protection mechanism(s) for communicating the policy message.

At block 503, trust mediator 116 determines the appropriate policy message communication channel(s) and/or protocol(s) for communicating the policy message, given the attack signature determined at block 302. To do this, trust mediator 116 uses a process similar to that discussed above for determining the appropriate data message communication channel(s) and protocol(s) for communicating data messages. In particular, trust mediator 116 compares the total risk level computed at block 401 to the predetermined threshold of acceptable risk discussed above. If the total risk level is less than or equal to the acceptable risk and use threshold then trust mediator 116 uses the current policy message communication channel(s) and policy message communication protocol(s) for communicating the policy message. If the total risk level is greater than the acceptable risk threshold then trust mediator 116 modifies the policy message communication channel(s) and/or policy message communication protocol(s) based on the protection matrix determined at block 301 and the predetermined acceptable risk threshold, and uses the modified policy message communication channel(s) and policy message communication protocol(s) for communicating the policy message, promoting equilibrium with respect to numerous assets, strategies, stakeholder payoffs, and attacker payoffs.

The example methods by which trust mediator 116 can modify the data message protection mechanism(s), data message communication channel(s), and data message communication protocol(s) discussed above, with respect to blocks 402 and 405, apply similarly to the policy message that will be utilized by security services module 114 and one or more of TM agents 108a-108f to enable dynamic changes across the system. In this way, an added layer of security is provided by using the processes used to secure the data messages to also secure the policy message. In one embodiment, the policy message changes based on an event, such as a change in time, location, direction, risk exposure, attack signature, etc., collectively evaluated as a holistic risk signature, with treatment and consideration of numerous attack and protection points and methods.

At block 504, trust mediator 116 transmits the policy message protection mechanism(s), policy message communication channel(s), and policy message communication protocol(s) determined at blocks 502 and 503, respectively, to the appropriate TM agents 108a-108f. In this way, the TM agents 108a-108f become configured to receive the policy message by using the proper policy message protection mechanism(s), policy message communication channel(s), and policy message communication protocol(s).

At block 505, trust mediator 116 transmits the policy message to the appropriate TM agents 108a-108f by using the policy message protection mechanism(s), policy message communication channel(s), and policy message communication protocol(s) determined at blocks 502 and 503, respectively. In this way, the TM agents 108a-108f establish a secure communication session by configuring their associated network components to communicate the data messages using the data message protection mechanism(s), data message communication channel(s), and data message communication protocol(s) determined above.

Process 500 is then repeated so as to ensure that the policy message protection mechanism(s), policy message communication channel(s), and policy message communication protocol(s) being implemented are sufficient for the latest detected attack signatures and protection matrix. In particular, trust mediator 116 uses and evaluates events, such as a change in time, location, etc., as indicated by sensory data compiled across system 100, to interact with security services module 114 to determine whether the currently implemented policy message protection mechanism(s), policy message communication channel(s), and/or policy message communication protocol(s) are to be changed. If a more up-to-date attack signature and/or protection matrix is available, then trust mediator repeats process 500 to implement appropriate policy message protection mechanism(s), policy message communication channel(s), and policy message communication protocol(s) to maintain the predetermined acceptable risk level.

IV. Example Implementations

The present invention (e.g., systems 100 and 200, processes 300-500, or any part(s) or function(s) thereof) can be implemented using hardware, software or a combination thereof and can be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 6:
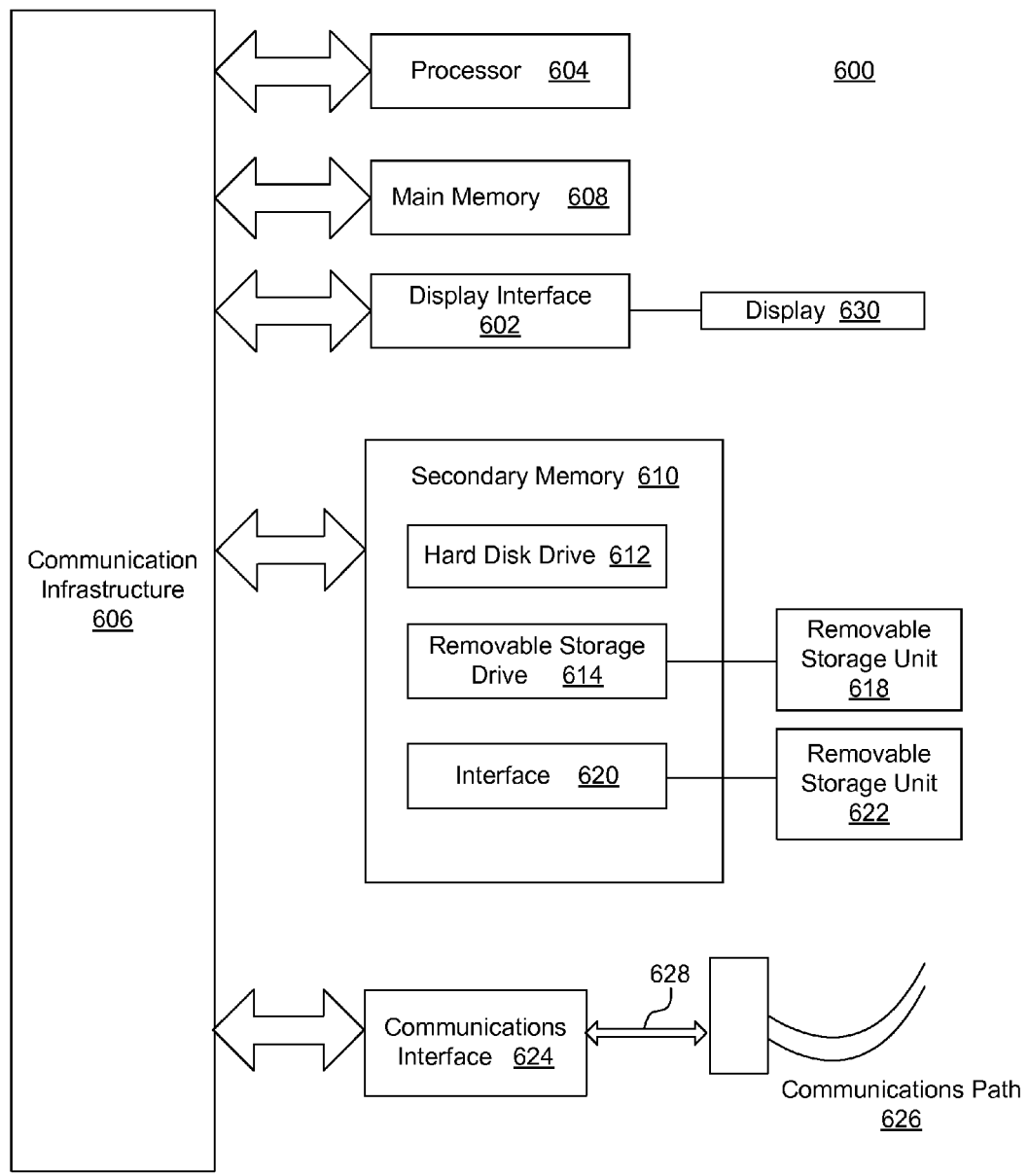
FIG. 6 is a block diagram of an exemplary computer system useful for implementing the present invention.

In fact, in one embodiment, the invention is directed toward one or more computer systems capable of carrying out the functionality described herein. An example of a computer system 600 is shown in FIG. 6.

Computer system 600 includes one or more processors, such as processor 604. The processor 604 is connected to a communication infrastructure 606 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 600 can include a display interface 602 that forwards graphics, text, and other data from the communication infrastructure 606 (or from a frame buffer not shown) for display on the display unit 630.

Computer system 600 also includes a main memory 608, preferably random access memory (RAM), and can also include a secondary memory 610. The secondary memory 610 can include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618 represents a floppy disk, magnetic tape, optical disk, etc. which is read by and written to by removable storage drive 614. As will be appreciated, the removable storage unit 618 includes a computer usable storage medium having stored therein computer software and/or data.

In alternative embodiments, secondary memory 610 can include other similar devices for allowing computer programs or other instructions to be loaded into computer system 600. Such devices can include, for example, a removable storage unit 622 and an interface 620. Examples of such can include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer system 600.

Computer system 600 can also include a communications interface 624. Communications interface 624 allows software and data to be transferred between computer system 600 and external devices. Examples of communications interface 624 can include a modem, a network interface (such as an Ethernet card), a communications port, a Personal Computer Memory Card International Association (PCMCIA) slot and card, etc. Software and data transferred via communications interface 624 are in the form of signals 628 which can be electronic, electromagnetic, optical or other signals capable of being received by communications interface 624. These signals 628 are provided to communications interface 624 via a communications path (e.g., channel) 626. This channel 626 carries signals 628 and can be implemented using wire or cable, fiber optics, a telephone line, a cellular link, a radio frequency (RF) link and other communications channels.

In this document, the terms "computer program medium," "computer-readable medium," and "computer-usable medium" are used to generally refer to media such as removable storage drive 614, a hard disk installed in hard disk drive 612, and/or signals 628. These computer program products provide software to computer system 600. The invention is directed to such computer program products.

Computer programs (also referred to as computer control logic) are stored in main memory 608 and/or secondary memory 610. Computer programs can also be received via communications interface 624. Such computer programs, when executed, enable the computer system 600 to perform the features of the present invention, as discussed herein. In particular, the computer programs, when executed, enable the processor 604 to perform the features of the present invention. Accordingly, such computer programs represent controllers of the computer system 600.

In an embodiment where the invention is implemented using software, the software can be stored in a computer program product and loaded into computer system 600 using removable storage drive 614, hard drive 612 or communications interface 624. The control logic (software), when executed by the processor 604, causes the processor 604 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software, with automated and man-in-the-loop operations.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it can be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method for securing mobile financial transactions, the method comprising:
   receiving, over a communication network, a list of protection mechanisms available for implementation by an external terminal;
   receiving, over the communication network, security related data from one or more sensors;
   computing an attack signature based on the security related data;
   storing, in a database, security policy data including a plurality of security policies;
   selecting a security policy from the plurality of security policies based on the list of protection mechanisms and the attack signature;
   establishing a secure communication session between the external terminal and an internal network component according to the selected security policy; and
   communicating, over the communication network during the secure communication session, a data message according to the selected security policy, the data message being associated with a mobile financial transaction.

2. The method of claim 1, wherein the selecting the security policy further includes:
   computing a value associated with the data message based on at least one of a value of the financial transaction and a predetermined valuation formula;
   computing a probability that security of the data message will be compromised based on the list of protection mechanisms and the attack signature;
   computing a total risk level as a product of (1) the value associated with the data message and (2) the probability that security of the data message will be compromised; and
   selecting the policy from the plurality of security policies that results in a risk level within a predetermined risk threshold.

3. The method of claim 1, wherein the security policy includes at least one of (1) an encryption algorithm for encrypting data messages, (2) a communication channel for communicating data messages and (3) a communication protocol for communication data messages.

4. The method of claim 1, wherein establishing a secure communication session further includes:
   constructing a policy message including at least one of a protection mechanism, a communication channel, and a communication protocol to be used for the communication session; and
   transmitting the policy message to the external terminal over the communication network.

5. The method of claim 4, wherein establishing a secure communication session further includes:
   determining a protection mechanism for the policy message based on the list of protection mechanisms and the attack signature;
   determining a communication channel for the policy message based on the list of protection mechanisms and the attack signature;
   determining a communication protocol for the policy message based on the list of protection mechanisms and the attack signature; and
   transmitting, over the communication network, the protection mechanism, the communication channel, and the communication protocol for the policy message.

6. The method of claim 1, wherein the security policy includes at least one of:
   channel encryption, payload encryption, encryption key rotation, encryption key generation using a biometric identifier, encryption key generation based on a pseudo-random number, communication channel split information, and data message reassembly information.

7. A system for securing mobile financial transactions, the system comprising:
   a memory operable to store security policy data including a plurality of security policies; and
   a processor coupled to the memory, the processor being programmed to:
      receive, over a communication network, a list of protection mechanisms available for implementation by an external terminal;
      receive, over the communication network, security related data from one or more sensors;
      compute an attack signature based on the security related data;
      select a security policy from the plurality of security policies based on the list of protection mechanisms and the attack signature;
      establish a secure communication session between the external terminal and an internal network component according to the selected security policy; and
      communicate, over the communication network during the secure communication session, a data message according to the selected security policy, the data message being associated with a mobile financial transaction.

8. The system of claim 7, wherein the processor is further programmed to:
   compute a value associated with the data message based on at least one of a value of the financial transaction and a predetermined valuation formula;
   compute a probability that security of the data message will be compromised based on the list of protection mechanisms and the attack signature;
   compute a total risk level as a product of (1) the value associated with the data message and (2) the probability that security of the data message will be compromised; and
   select the policy from the plurality of security policies that results in a risk level within a predetermined acceptable risk threshold.

9. The system of claim 7, wherein the security policy includes at least one of (1) an encryption algorithm for encrypting data messages, (2) a communication channel for communicating data messages, and (3) a communication protocol for communicating data messages.

10. The system of claim 7, wherein the processor is further programmed to:
    construct a policy message including at least one of a protection mechanism, a communication channel, and a communication protocol to be used for the communication session; and
    transmit the policy message to the external terminal over the communication network.

11. The system of claim 7, wherein the processor is further programmed to:
    determine a protection mechanism for the policy message based on the list of protection mechanisms and the attack signature;
    determine a communication channel for the policy message based on the list of protection mechanisms and the attack signature;

determine a communication protocol for the policy message based on the list of protection mechanisms and the attack signature; and transmit, over the communication network, the protection mechanism, the communication channel, and the communication protocol for the policy message.

12. The system of claim 7, wherein the security policy includes at least one of:

channel encryption, payload encryption, encryption key rotation, encryption key generation using a biometric identifier, encryption key generation based on a pseudo-random number, communication channel split information, and data message reassembly information.

13. A non-transitory computer-readable medium having stored thereon sequences of instructions, the sequences of instructions including instructions, which, when executed by a computer system, cause the computer system to perform:

receiving, over a communication network, a list of protection mechanisms available for implementation by an external terminal;

receiving, over the communication network, security related data from one or more sensors;

computing an attack signature based on the security related data;

storing, in a database, security policy data including a plurality of security policies;

selecting a security policy from the plurality of security policies based on the list of protection mechanisms and the attack signature;

establishing a secure communication session between the external terminal and an internal network component according to the selected security policy; and communicating, over the communication network during the secure communication session, a data message according to the selected security policy, the data message being associated with a mobile financial transaction.

14. The non-transitory computer readable medium of claim 13, wherein the sequences of instructions further include instructions, which, when executed by the computer system, cause the computer system to perform:

computing a value associated with the data message based on at least one of a value of the financial transaction and a predetermined valuation formula;

computing a probability that security of the data message will be compromised based on the list of protection mechanisms and the attack signature;

computing a total risk level as a product of (1) the value associated with the data message and (2) the probability that security of the data message will be compromised; and selecting the policy from the plurality of security policies that results in a risk level within a predetermined risk threshold.

15. The non-transitory computer readable medium of claim 13, wherein the security policy includes at least one of (1) an encryption algorithm for encrypting data messages, (2) a communication channel for communicating data messages, and (3) a communication protocol for communicating data messages.

16. The non-transitory computer readable medium of claim 13, wherein the sequences of instructions further include instructions, which, when executed by the computer system, cause the computer system to perform:

constructing a policy message including at least one of a protection mechanism, a communication channel, and a communication protocol to be used for the communication session; and transmitting the policy message to the external terminal over the communication network.

17. The non-transitory computer readable medium of claim 13, wherein the sequences of instructions further include instructions, which, when executed by the computer system, cause the computer system to perform:

determining a protection mechanism for the policy message based on the list of protection mechanisms and the attack signature;

determining a communication channel for the policy message based on the list of protection mechanisms and the attack signature;

determining a communication protocol for the policy message based on the list of protection mechanisms and the attack signature; and transmitting, over the communication network, the protection mechanism, the communication channel, and the communication protocol for the policy message.

18. The non-transitory computer readable medium of claim 13, wherein security policy includes at least one of:

channel encryption, payload encryption, encryption key rotation, encryption key generation using a biometric identifier, encryption key generation based on a pseudo-random number, communication channel split information, and data message reassembly information.

* * * * *